US 10,288,453 B2

(12) United States Patent
Suzuishi et al.

(10) Patent No.: US 10,288,453 B2
(45) Date of Patent: May 14, 2019

(54) RESIN ENCODER SCALE, MOLD FOR RESIN ENCODER SCALE, METHOD FOR PRODUCING RESIN ENCODER SCALE, AND ENCODER

(71) Applicants: MAXELL, LTD., Kyoto (JP); NIKON CORPORATION, Tokyo (JP)

(72) Inventors: Mitsunobu Suzuishi, Sendai (JP); Masataka Shibuya, Shirataka-nachi (JP); Hiroshi Tokairin, Natori (JP)

(73) Assignees: MAXELL, LTD., Kyoto (JP); NIKON CORPORATION, Tokyo (JP)

( * ) Notice: Subject to any disclaimer, the term of this patent is extended or adjusted under 35 U.S.C. 154(b) by 1043 days.

(21) Appl. No.: 14/521,886

(22) Filed: Oct. 23, 2014

(65) Prior Publication Data

US 2015/0090868 A1    Apr. 2, 2015

Related U.S. Application Data

(63) Continuation of application No. PCT/JP2013/061163, filed on Apr. 15, 2013.

(30) Foreign Application Priority Data

Apr. 23, 2012    (JP) .................................. 2012-098242

(51) Int. Cl.
*G01D 5/347*    (2006.01)
*B29C 45/00*    (2006.01)
(Continued)

(52) U.S. Cl.
CPC ..... *G01D 5/34707* (2013.01); *B29C 45/0053* (2013.01); *B29C 45/16* (2013.01);
(Continued)

(58) Field of Classification Search
CPC ............ G01D 5/34707; B29C 45/0053; B29C 45/16; B29C 45/372; B29K 2069/00;
(Continued)

(56) References Cited

U.S. PATENT DOCUMENTS 4,988,945 A    1/1991    Nagase
5,189,481 A *  2/1993    Jann ...................... G01N 21/94
                                                 250/559.41
(Continued)

FOREIGN PATENT DOCUMENTS

CN    1538148 A    10/2004
JP    S58-150154 A    9/1983
(Continued)

OTHER PUBLICATIONS

Feb. 6, 2016 Office Action issued in Chinese Patent Application No. 201380021101.0.
(Continued)

*Primary Examiner* — Georgia Y Epps
*Assistant Examiner* — Don J Williams
(74) *Attorney, Agent, or Firm* — Oliff PLC

(57) ABSTRACT

A purpose is to provide a resin encoder scale a cost of which can be reduced by making processing easy by producing the encoder scale as a resin molded piece including a scale pattern. A resin encoder scale is used in a reflection-type optical encoder and a scale pattern for position measurement is provided thereto. In the scale pattern, a low reflection part a surface of which is molded as a rough surface during resin molding and which has low reflectivity of light and a high reflection part a surface of which is molded as a mirror surface during the resin molding and which has higher reflectivity of light than the low reflection part are arranged alternately.

23 Claims, 10 Drawing Sheets

(51) Int. Cl.
*B29C 45/16* (2006.01)
*B29C 45/26* (2006.01)
*B29C 45/37* (2006.01)
B29K 33/00 (2006.01)
B29K 69/00 (2006.01)
B29L 9/00 (2006.01)
B29L 11/00 (2006.01)

(52) U.S. Cl.
CPC ............ *B29C 45/26* (2013.01); *B29C 45/372* (2013.01); *B29K 2033/12* (2013.01); *B29K 2069/00* (2013.01); *B29K 2995/003* (2013.01); *B29L 2009/00* (2013.01); *B29L 2011/0083* (2013.01)

(58) Field of Classification Search
CPC ........... B29K 2995/003; B29L 2009/00; B29L 2011/0083
See application file for complete search history.

(56) References Cited

U.S. PATENT DOCUMENTS

| | | | | |
|---|---|---|---|---|
| 5,658,707 | A * | 8/1997 | Takuma | G11B 7/248 430/270.15 |
| 2002/0008195 | A1* | 1/2002 | Aoki | G01D 5/34715 250/231.14 |
| 2002/0122186 | A1* | 9/2002 | Igaki | G01D 5/36 356/616 |
| 2004/0238733 | A1* | 12/2004 | Fujita | G21K 1/06 250/251 |
| 2009/0267803 | A1* | 10/2009 | Tominaga | G01D 5/34707 341/13 |
| 2010/0213642 | A1* | 8/2010 | Ootera | B29C 33/3857 264/447 |

FOREIGN PATENT DOCUMENTS

| | | |
|---|---|---|
| JP | S59224514 A | 12/1984 |
| JP | S60-4721 A | 1/1985 |
| JP | S61-122566 U | 8/1986 |
| JP | S63-83612 A | 4/1988 |
| JP | S6459011 A | 3/1989 |
| JP | H04-93611 A | 3/1992 |
| JP | H06-201906 A | 7/1994 |
| JP | H06-323872 A | 11/1994 |
| JP | 2000-352527 A | 12/2000 |
| JP | 2001-079854 A | 3/2001 |
| JP | 2003021542 A | 1/2003 |
| JP | 2003114140 A | 4/2003 |
| JP | 2003-166855 A | 6/2003 |
| JP | 2004-017728 A | 1/2004 |
| JP | 2004-045391 A | 2/2004 |
| JP | 2004177287 A | 6/2004 |
| JP | 2006-337321 A | 12/2006 |
| JP | 2008-014739 A | 1/2008 |
| JP | 2013-181964 A | 9/2013 |

OTHER PUBLICATIONS

Mar. 29, 2016 Office Action issued in Japanese Patent Application No. 2012-098242.
Aug. 18, 2015 Office Action issued in Japaneese Patent Application No. 2012-098242.
May 14, 2013 Written Opinion issued in International Application No. PCT/JP2013/061163.
May 14, 2013 Search Report issued in International Application No. PCT/JP2013/061163.
Nov. 1, 2016 Office Action issued in Japan Application No. 2012-098242.
Sep. 26, 2017 Office Action issued in Japanese Application No. 2012-98242.

* cited by examiner

RESIN ENCODER SCALE, MOLD FOR RESIN ENCODER SCALE, METHOD FOR PRODUCING RESIN ENCODER SCALE, AND ENCODER

This is a Continuation of International Application No. PCT/JP2013/061163 filed Apr. 15, 2013, which claims the benefit of Japanese Application No. 2012-098242 filed Apr. 23, 2012. The disclosure of the prior applications is hereby incorporated by reference herein in its entirety.

TECHNICAL FIELD

The present invention relates, for example, to an encoder scale of an encoder, which detects a position of a member when the member moves, and relates to a resin encoder scale, a mold for the resin encoder scale, a method for producing the resin encoder scale, and an encoder.

BACKGROUND ART

Generally, an encoder to detect a position of a moving member is known. The encoder includes an encoder scale, which includes a scale, and a head to move relatively to the encoder scale and to read the scale of the encoder scale in the movement. As the encoder, a linear encoder to detect a position on a straight line of when a member moves in a straight line and a rotary encoder to detect a rotation angle (position) of when the member moves rotationally have been known.

Also, as a method with which the head reads the scale of the encoder scale, a magnetic method to use a magnetic head and an optical method to use an optical sensor have been known. Also, as the scale of the encoder scale, an increment method to measure a relative position and an absolute method to measure an absolute position have been known. Also, as the above-described optical method, a transmission method in which a slit is provided, as a scale, to the encoder scale and a reflection method in which a reflection surface having high reflectivity and a non-reflection surface having reflectivity lower than that of the reflection surface are included, as scale patterns having different reflectivity, in an encoder scale.

To the head in the optical method, a light emitting element and a light receiving element are provided. In the transmission-type, the light emitting element and the light receiving element are respectively arranged to both sides of the encoder scale, the encoder scale being sandwiched therebetween. On the other hand, in the reflection method, the light emitting element and the light receiving element are arranged on one side of the encoder scale. Thus, the reflection method is advantageous to downsizing compared to the transmission method.

In the encoder scale used in the reflection method, the reflection surface and the non-reflection surface having different reflectivity in respect to light emitted from the light emitting element are provided. By repetition of the reflection surface and the non-reflection surface, a scale pattern is formed. As a method for forming the scale pattern, for example, the following method has been known. That is, first, an $SiO_2$ layer to adhere a reflection film onto a surface of a glass plate is formed. Then, an Al layer as a reflection film is formed and a $Cr_2O_3$ layer to adhere a non-reflection film to the Al layer is formed. Subsequently, a Cr layer as a non-reflection film is formed and a scale pattern is formed from a reflection surface including the Al layer and a non-reflection surface including the Cr layer by a lithography method (see, for example, Patent Literature 1).

Also, in Patent Literature 1, it has been proposed to use a metallic plate including aluminum or aluminum alloy having high reflectivity of light as a reflection-type encoder scale instead of a glass plate, to form a mirror surface on a side surface of the metallic plate by cutting processing, and to form, as a scale pattern on the mirror surface, a reflection surface having a mirror surface and high reflectivity and a non-reflection surface having reflectivity of light lower than that of the reflection surface, for example, by evaporating, to the mirror surface, chromium having reflectivity of light lower than that of aluminum.

Note that in Patent Literature 1, it has been proposed to form the non-reflection surface by decreasing reflectivity of light by performing coloring processing on the mirror surface or by performing surface-roughing processing on the mirror surface in a case of providing the non-reflection surface.

Also, as a method to form, on a plate such as a glass plate, a scale pattern including a reflection surface and a non-reflection surface, the following methods have been known. That is, for example, a method to form a mirror surface reflection part to be a reflection surface by evaporating a metallic cover film to the glass plate and by performing etching processing to a part to be the non-reflection surface on the mirror surface reflection part, and a method to form a scale pattern on a side surface of a plate to be material by performing print processing of high contrast on the plate to be a material (see, for example, Patent Literature 2).

In the above-described embodiment, for example, white is printed as a reflection surface and black is formed as a non-reflection surface on a flat-and-smooth side surface of a glass substrate, whereby a scale pattern is formed.

CITATION LIST

Patent Literature

Patent Literature 1: JP 2009-8457 A
Patent Literature 2: JP 2003-307440 A

SUMMARY OF INVENTION

Technical Problem

Incidentally, in the above-described reflection-type encoder scale, when a scale pattern in which a reflection surface and non-reflection surface are alternately provided is provided, it is necessary to perform processing including relatively great number of processes for each glass plate or metallic plate of each encoder scale. Thus, in production of the encoder scale, it requires a great care and a long period of time to perform processing and a cost of the encoder scale becomes high.

Also, in the transmission-type encoder scale, many kinds of processing are necessary for each encoder scale. For example, a great care and a long period of time has been necessary, for example, to provide, on a metallic plate which does not transmit light, a slit to transmit light or to form, on a glass plate which transmits light, a part which does not transmit light.

As described, due to the increase in a cost of the encoder scale, a cost of an encoder is also increased. Thus, it is not possible to use, for a product with a low price, an encoder which can measure a rotation angle or a linear movement position with high accuracy and a range of usage of the encoder becomes narrow.

The present invention has been made in the view of the forgoing circumstance and is to provide a resin encoder scale, a mold for a resin encoder scale, a method for producing a resin encoder scale, and an encoder which are capable of performing processing easier and to reduce a cost by producing the encoder scale as a molded resin piece including a scale pattern.

Solution to Problem

A resin encoder scale of the present invention is used in a reflection-type optical encoder and includes a scale pattern for position measurement, wherein the scale pattern which is a combination of a low reflection part a surface of which is molded as a rough surface during resin molding and which has low reflectivity of light and a high reflection part a surface of which is molded as a mirror surface during the resin molding and which has higher reflectivity of light than the low reflection part is provided.

Also, in the resin encoder scale, a reflection film is preferably provided at least on the whole scale pattern.

Also, it is preferred that the high reflection part is formed in a protruded manner relative to the low reflection part and that a height of protrusion of the high reflection part relative to the low reflection part is shorter than 100 µm.

It is preferred that the reflectivity of light of the high reflection part is set to be 50% or higher and the reflectivity of light of the low reflection part is set to be 25% or lower and a difference between the reflectivity of the high reflection part and that of the low reflection part is 25% or larger.

Also, it is preferred that roughness of a surface Ra of the high reflection part is 0.05 µm or smaller and roughness of a surface Ra of the low reflection part is 0.1 µm or larger.

The resin encoder scale of the present invention is used in a transmission-type optical encoder and includes a scale pattern for position measurement, the resin encoder scale being made from a transparent resin material, wherein the scale pattern which is a combination of a low transmission part a surface of which is molded as a rough surface during resin molding and which has low transmittance of light and a high transmission part a surface of which is molded as a mirror surface during the resin molding and which has higher transmittance of light than the low transmission part is provided.

Also, it is preferred that the high transmission part is formed in a protruded manner relative to the low transmission part and that a height of protrusion of the high transmission part relative to the low transmission part is shorter than 100 µm.

Also, it is preferred that the transmittance of light of the high transmission part is set to be 50% or higher and the transmittance of light of the low transmission part is set to be 25% or lower and a difference between the transmittance of the high transmission part and that of the low transmission part is 25% or larger.

Also, it is preferred that roughness of a surface Ra of the high transmission part is 0.05 µm or smaller and roughness of a surface Ra of the low transmission part is 0.1 µm or larger.

A mold for a resin encoder scale of the present invention is a mold for molding a resin encoder scale which is used in an optical encoder and to which a scale pattern for position measurement is provided, wherein a mold pattern which is a combination of a rough surface on which surface-roughing processing is performed and a mirror surface on which mirror-finishing is performed is provided, corresponding to the scale pattern, on a mold surface to mold the scale pattern of the resin encoder scale.

Also, it is preferred that the rough surface is formed in a protruded manner relative to the mirror surface in the mold pattern and a height of protrusion of the rough surface relative to the mirror surface is shorter than 100 µm.

Also, it is preferred that roughness of a surface Ra of the mirror surface is 0.05 µm or smaller and roughness of a surface Ra of the rough surface is 0.1 µm or larger in the mold pattern.

Also, in the mold for a resin encoder scale, in order to mold a reflection-type resin encoder scale which reflects light and includes a scale pattern which is a combination of a low reflection part having low reflectivity of light and a high reflection part having higher reflectivity of light than the low reflection part, it is preferred that the rough surface of the mold pattern provided on the mold surface molds the low reflection part and the mirror surface thereof molds the high reflection part.

Also, in the mold for a resin encoder scale, in order to mold a transmission-type resin encoder scale which transmits light because of a transparent resin material included therein and includes a scale pattern which is a combination of a low transmission part having low transmittance of light and a high transmission part having higher transmittance of light than the low transmission part, it is preferred that the rough surface of the mold pattern provided to the mold surface molds the low transmission part and the mirror surface thereof molds the high transmission part.

A method for producing a resin encoder scale of the present invention is to perform injection molding, by injecting resin into a mold, of a resin encoder scale which is used in an optical encoder and to which a scale pattern for position measurement is provided, the method including producing the resin encoder scale including the scale pattern, which is a combination of a mirror surface molded by a mirror surface of the mold and a rough surface molded by a rough surface of the mold, by injecting resin into the mold in which a mold pattern is provided, corresponding to the scale pattern, to a mold surface configured to mold the scale pattern of the encoder scale, the mold pattern being a combination of the rough surface on which surface-roughing processing is performed and the mirror surface on which mirror-finishing processing is performed.

Also, in the method for producing a resin encoder scale, in order to mold a reflection-type resin encoder scale which reflects light and includes a scale pattern which is a combination of a low reflection part having low reflectivity of light and a high reflection part having higher reflectivity of light than the low reflection part, it is preferred that the rough surface of the mold pattern provided on the mold surface molds the low reflection part and the mirror surface thereof molds the high reflection part.

Also, in the method for producing a resin encoder scale, it is preferred to provide a reflection film at least on the whole scale pattern of the resin encoder scale molded by using the mold.

Also, in the method for producing a resin encoder scale, in order to mold a transmission-type resin encoder scale which transmits light because of a transparent resin material included therein and includes a scale pattern which is a combination of a low transmission part having low transmittance of light and a high transmission part having higher transmittance of light than the low transmission part, it is preferred that the rough surface of the mold pattern provided to the mold surface molds the low transmission part and the mirror surface thereof molds the high transmission part.

The encoder of the present invention includes the above-described reflection-type resin encoder scale and a head including a light emitting element configured to emit light to the encoder scale and a light receiving element configured to receive light emitted from the light emitting element and reflected by the encoder scale, wherein when the head moves relative to the encoder scale, a position of the head relative to the encoder scale is measured based on a variation in a quantity of received light in the light receiving element due to a difference between reflectivity of light of the low reflection part and that of the high reflection part in the scale pattern.

The encoder of the present invention includes the above-described transmission-type resin encoder scale and a head including a light emitting element configured to emit light to the encoder scale and a light receiving element configured to receive light emitted from the light emitting element through the encoder scale, wherein when the head moves relative to the encoder scale, a position of the head relative to the resin encoder scale is measured based on a variation in a quantity of received light in the light receiving element due to a difference between transmittance of light of the low transmission part and that of the high transmission part in the scale pattern.

Advantageous Effects of Invention

According to a mold for a resin encoder scale of the present invention, on the mold for molding a resin encoder scale, a mold pattern, which includes a combination of a rough surface which is formed by surface-roughing processing and a mirror surface which is formed by mirror-finishing processing, is provided on a mold surface in order to mold a scale pattern to be provided to the resin encoder scale.

When a resin encoder scale is molded by using this mold, a scale pattern including a rough surface molded by the rough surface of the mold and a mirror surface molded by the mirror surface of the mold are provided to the molded resin encoder scale. That is, it becomes possible to produce a resin encoder scale including a scale pattern by injection molding.

In this case, it is not necessary to perform, for each encoder scale, processing to provide a part which transmits light and a part which does not transmit light or to provide a part having high reflectivity and a part having low reflectivity.

Also, by the injection molding, it is possible to mold a plurality of molded pieces in one molding process and to produce a great number thereof in a short period of time by repeating the injection molding. Thus, it is possible to reduce a cost of producing an encoder scale of an optical encoder greatly. Accordingly, it is possible to reduce a cost of an encoder using the resin encoder scale.

Also, in a reflection-type resin encoder scale to which a scale pattern is provided by a combination of a low reflection part having low reflectivity of light and a high reflection part having higher reflectivity of light than the low reflection part, it is possible to mold the low reflection part by the rough surface of the mold and to mold the high reflection part by the mirror surface of the mold. Here, when resin used for the resin encoder scale is resin (which may include material, such as pigment, to increase reflectivity) having high reflectivity of light, the part mirror-finished by the mold has higher reflectivity than the part roughed by the mold.

Thus, it is possible to provide a difference between reflectivity of the rough surface and that of the mirror surface.

Also, when reflectivity of light of the resin itself is not high, it is possible to form a reflection film on a part of the scale pattern and to improve reflectivity of light. In this case, even when a reflection film is formed on the whole scale pattern including both of the high reflection part and the low reflection part without performing processing of forming the reflection film only on the high reflection part formed as the mirror surface, it is possible to make the high reflection part formed as the mirror surface and the low reflection part formed as the rough surface have different reflectivity. That is, even when a reflection film is provided uniformly on the scale pattern, the reflectivity of light of the reflection film on the mirror surface becomes high and the reflectivity of light of the reflection film on the rough surface becomes low.

In other words, it is possible to form the reflection film uniformly on a whole surface of the resin encoder scale on which surface the scale pattern is formed and to easily form the reflection film with a low cost in a short period of time compared to a case of forming a reflection film only on the high reflection part.

Also, in a transmission-type resin encoder scale to which a scale pattern is provided by a combination of a low transmission part having low transmittance of light and a high transmission part having higher transmittance of light than the low transmission part, it is possible to mold the low transmission part by the rough surface of the mold and to mold the high transmission part by the mirror surface of the mold. That is, in a transparent resin including a transparent resin material, transmittance of light is increased by forming a surface as the mirror surface and transmittance of light is decreased by forming the surface as the rough surface.

Thus, as an encoder scale for the transmission-type encoder, a resin encoder scale including a scale pattern which includes a combination of a low transmission part and an advanced course part can be obtained. In both of the reflection-type and the transmission-type, basically, an encoder scale can be produced by molding with resin. Thus, a cost can be reduced.

Also, in the mold for a resin encoder scale, there is a method to form a rough surface by blast processing at least on a part on which a mold pattern is formed and to form a mirror surface by cutting apart to be the mirror surface. In this case, the mirror surface is formed by cutting the rough surface. Thus, the mirror surface is recessed relative to the rough surface. That is, the rough surface is protruded relative to the mirror surface. In this case, it is preferable to form the mirror surface by cutting the rough surface at least for a depth equal to or deeper than the maximum depth of a recess part of the rough surface, that is, of the roughed surface.

Also, a recess and a protrusion of the mirror surface and the rough surface of the mold pattern of the mold are transferred to a resin encoder scale molded by the mold. In the resin encoder scale, a mirror surface (high reflection part or high transmission part) is protruded relative to a rough surface (low reflection part or low transmission part). Due to a step part between the recess and the protrusion, a shadow of light from a light emitting element of a head of the encoder may be generated or reflection of the light may be caused, and thus, a difference in height is preferably small. In the mold and the resin encoder scale, the difference in height between the mirror surface and the rough surface is preferably 100 μm or smaller.

Also, in the reflection-type resin encoder scale, it is necessary that a definite difference in a quantity of received light in a light receiving element is generated by a difference in reflectivity between the high reflection part and the low reflection part. Thus, reflectivity of the high reflection part is preferably 50% or higher and reflectivity of the low reflection part is preferably 25% or lower. That is, a difference between the reflectivity of the high reflection part and the reflectivity of the low reflection part is preferably 25% or larger.

Also, in the transmission-type resin encoder scale, it is necessary that a definite difference in a quantity of received light in the light receiving element is generated by a difference, in transmittance, between the high transmission part and the low transmission part. Thus, transmittance of the high transmission part is preferably 50% or higher and transmittance of the low transmission part is preferably 25% or lower. That is, a difference between the transmittance of the high transmission part and the transmittance of the low transmission part is 25% or larger.

To realize the above-described reflectivity or transmittance, roughness of a surface Ra of each of the high reflection part and the high transmission part is preferably 0.05 µm or smaller and roughness of a surface Ra of each of the low reflection part and the low transmission part is preferably 0.1 µm or larger.

The rough surfaces (low reflection part and low transmission part) and the mirror surfaces (high reflection part and high transmission part) of the resin encoder scale are surfaces transferred from the mold. Also, in the mold, roughness of a surface Ra of the mirror surface of the mold pattern is preferably 0.05 µm or smaller and roughness of a surface Ra of the rough surface thereof is preferably 0.1 µm or larger.

DESCRIPTION OF EMBODIMENTS

In the following, a first embodiment of the present embodiment will be described with reference to the drawings.

Figure 1:
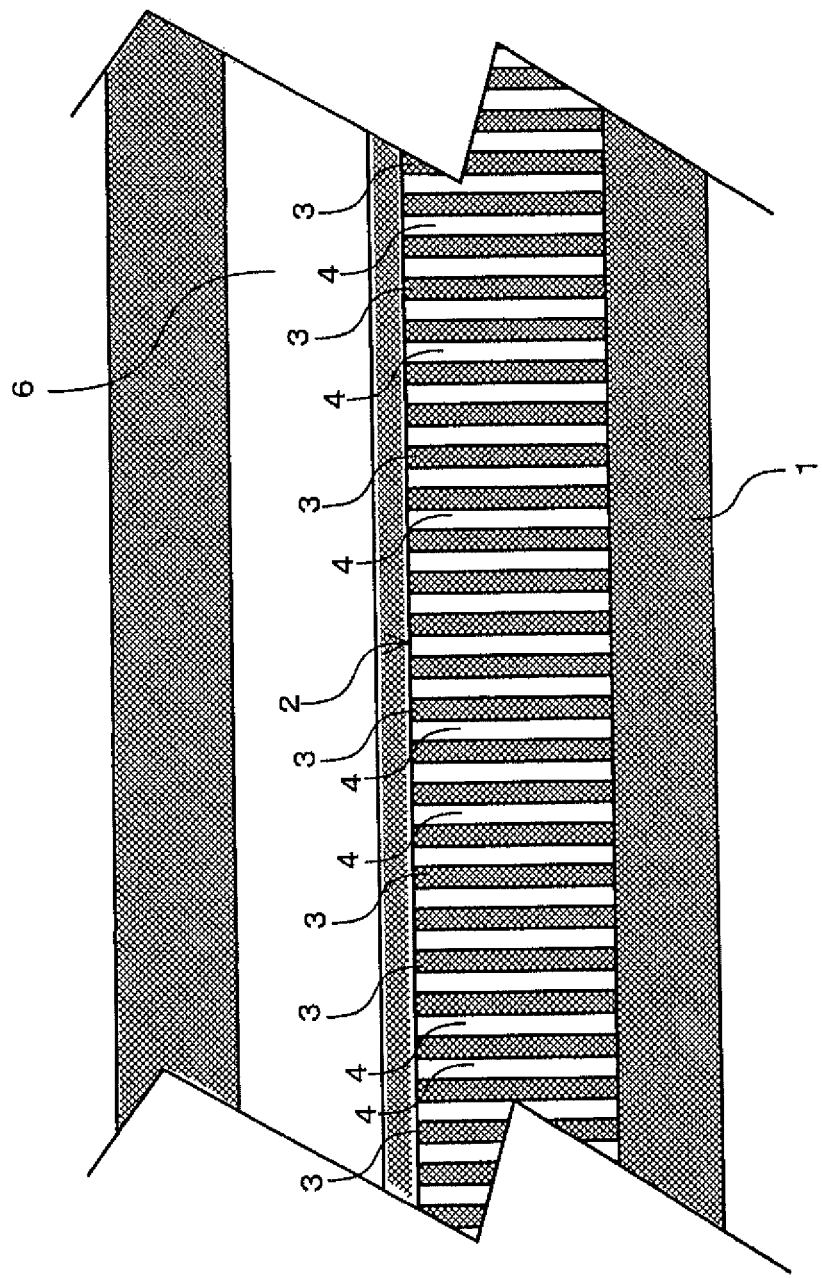
FIG. 1 is a plane view of a main part illustrating a resin encoder scale of a linear encoder according to a first embodiment of the present invention.
Figure 2:
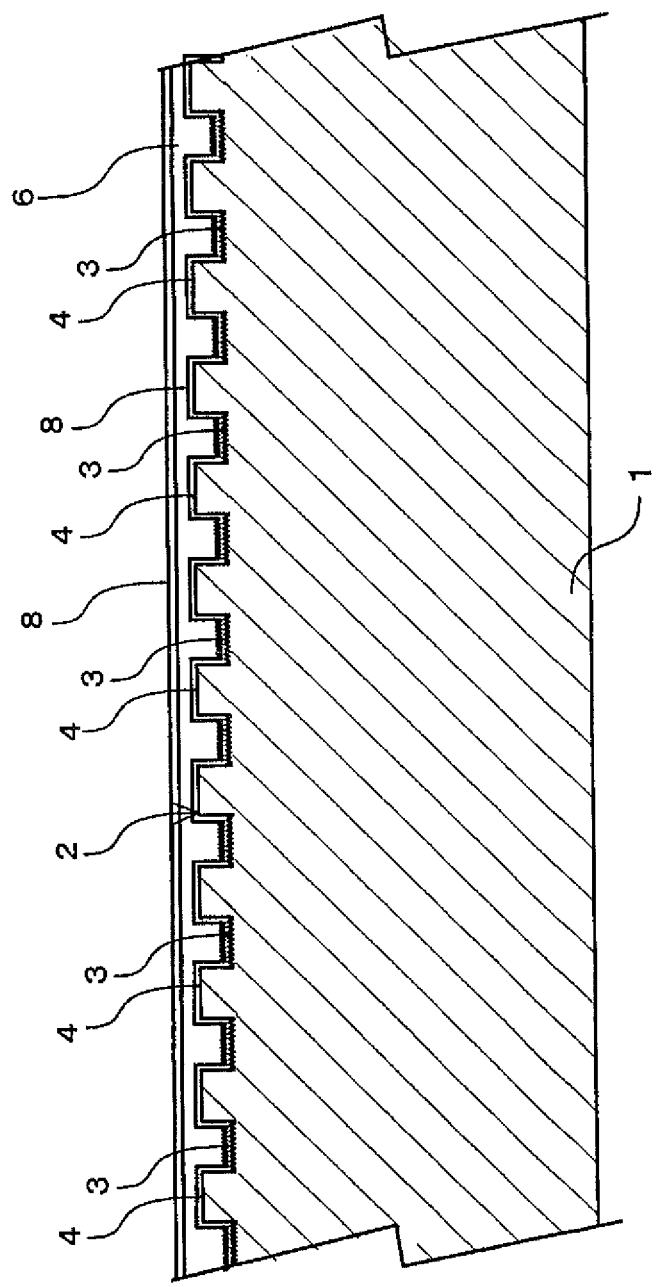
FIG. 2 is a sectional view of a main part in a length direction, illustrating the resin encoder scale.
Figure 3:
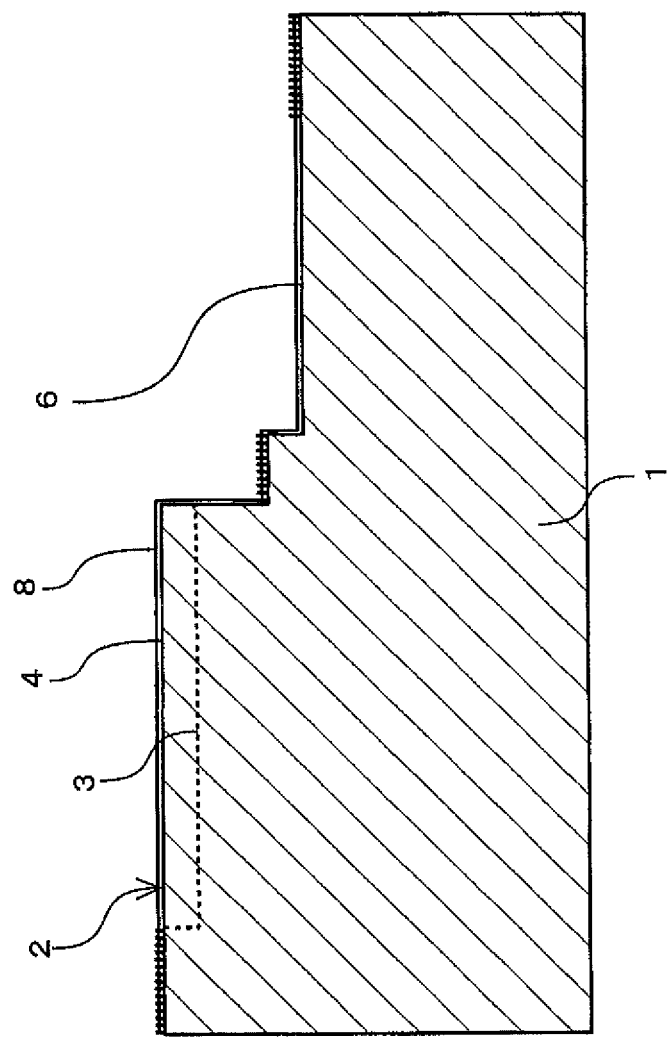
FIG. 3 is a sectional view in a width direction, illustrating the resin encoder scale.

As illustrated in FIG. 1 to FIG. 3, a resin encoder scale 1 of the embodiment is an encoder scale used for a reflection-type optical linear encoder (incremental-type linear encoder 20 described later) being made from resin and is molded by injection molding.

The resin encoder scale 1 is molded, for example, in a rectangular plate shape elongated in one direction and a scale pattern 2 is molded on an upper surface (position measurement surface) thereof. The scale pattern 2 includes a combination of a low reflection part 3 having low reflectivity and a high reflection part 4 having higher reflectivity than the low reflection part 3. In the embodiment, the low reflection part 3 and the high reflection part 4 are alternately arranged in the length direction of the resin encoder scale 1 (direction of relative movement (measurement direction) of head 21 relative to encoder scale 1 described later). Thus, an incremental scale pattern 2 is provided.

A surface of the low reflection part 3 is a rough surface (roughed surface). Also, a surface of the high reflection part 4 is a mirror surface. That is, there is a great difference between roughness of a surface of the low reflection part 3 and that of the high reflection part 4. Thus, there is a great difference in reflectivity of light. The difference between the roughness of a surface of the low reflection part 3 and that of the high reflection part 4 is based on roughness of a surface of a rough surface 13 and roughness of a surface of a mirror surface 14 of when the injection molding of the resin encoder scale 1 is performed, which surfaces are formed on a mold surface 11 of a mold 10 which will be described later. The difference only needs to make the following possible. That is, in a case where the reflection-type optical encoder is used and when a light receiving element receives pieces of light which are emitted from a light emitting element and are respectively reflected by the low reflection part 3 and the high reflection part 4, a difference between a quantity of received reflection light from the low reflection part 3 and a quantity of received reflection light from the high reflection part 4 can be recognized adequately.

For example, the reflectivity of the high reflection part 4 is preferably 50% or higher and the reflectivity of the low reflection part 3 is preferably 25% or lower. Also, a difference between the reflectivity of the high reflection part 4 and the reflectivity of the low reflection part 3 is preferably 25% or larger. Moreover, the reflectivity of the high reflection part 4 is preferably 80% or higher and the reflectivity of the low reflection part 3 is preferably 25%. Furthermore, the reflectivity of the low reflection part 3 is preferably 10% or lower.

Also, a difference between the reflectivity of the high reflection part 4 and the reflectivity of the low reflection part 3 is preferably 25% or larger. It is further preferred that the difference between the reflectivity of the high reflection part 4 and the reflectivity of the low reflection part 3 is 55% or larger and that the difference is 70% or larger.

By making the difference between the reflectivity of the high reflection part 4 and the reflectivity of the low reflection part 3 equal to or larger than 25%, as described above, it becomes possible to give an adequate difference in a quantity of received light in the light receiving element and to optically read the scale pattern 2 of the resin encoder scale 1 adequately.

Also, to realize the above-described reflectivity of the high reflection part 4 and the low reflection part 3, the roughness of a surface Ra of the high reflection part 4 is preferably 0.05 µm or smaller and the roughness of a surface Ra of the low reflection part 3 is preferably 0.1 µm or larger. Also, it is further preferred that the roughness of a surface Ra of the high reflection part 4 is 0.01 µm or smaller and the roughness of a surface Ra of the low reflection part 3 is 1.0 µm or larger.

Note that it is necessary that roughness of a surface Ra of a reference track 6 is similar to that of the high reflection part 4.

In the scale pattern 2, the low reflection part 3 and the high reflection part 4 each of which becomes a scale are arranged with the same width. The width is longer than an alternation pitch of the low reflection part 3 and the high reflection part 4. Note that here, the width is a length in a direction orthogonal to a longitudinal direction (direction of relative movement of head) of the resin encoder scale 1. Thus, the width direction is also orthogonal to a direction of the pitch in the longitudinal direction of the resin encoder scale 1.

Also, based on a structure of the mold surface 11 of the mold 10 for a resin encoder scale, which mold will be described later, the high reflection part 4 is slightly protruded compared to the low reflection part 3. That is, the low reflection part 3 is formed as a recess part and the high reflection part 4 is formed as a protruded part and a step is formed between the low reflection part 3 and the high reflection part 4. Note that in the drawing, to emphasize the recess part and the protruded part, the step is enlarged from an actual size thereof.

As described above, the high reflection part 4 is formed in a protruded manner relative to the low reflection part 3 and a height of protrusion of the high reflection part 4 relative to the low reflection part 3 is preferably shorter than 100 µm. It is further preferred that the height of protrusion of the high reflection part 4 relative to the low reflection part 3 is shorter than 60 µm and that the height of protrusion of the high reflection part 4 relative to the low reflection part 3 is shorter than 20 µm.

When the height of the high reflection part 4 is too high compared to the low reflection part 3, it is likely that light is blocked or reflected by the step between the low reflection part 3 an the high reflection part 4 and there may be a bad influence when the light receiving element receives light from the light emitting element.

Note that in the embodiment, a surface of the low reflection part and a surface of the high reflection part are plane surfaces substantially parallel to each other.

Also, a pitch between the low reflection part 3 and the high reflection part 4 each of which is a scale of the scale pattern 2 is, for example, at a 0.1 mm level and a length in a measurement direction (direction of relative movement of head) in each of the low reflection part 3 and the high reflection part 4 is around a half of the pitch. Note that the pitch (resolution of scale) of the scale pattern 2 is not limited to what has been described above and is basically determined by precision of an ultra-precision processing device used for processing of the mold pattern 12 of the mold 10.

It is possible to make the pitch of the scale pattern 2 longer than the precision of the ultra-precision processing device. When the pitch is long, instead of the ultra-precision processing device, a processing device having lower precision than the ultra-precision processing device can be used.

Note that as described later, when the mold is produced, the mold pattern can be formed more precisely by using a stamper processed delicately by photolithography. Note that for example, the stamper is a nickel thin plate to which a pattern is formed by photolithography and is used by being attached to the mold.

The reference track 6 which has reflectivity of light similar to that of the high reflection part 4 is formed in a neighborhood of the scale pattern 2 and in an alternation direction (direction of relative movement of head 21) of the low reflection part 3 and the high reflection part 4. The reference track 6 has a width slightly narrower than that of the scale pattern 2 and is formed from one end of the scale pattern 2 to the other end thereof in a zonal manner in the direction of relative movement of the head.

For example, the reference track 6 reflects light emitted from the light emitting element. Then, the reference track 6 makes a light receiving element for the reference track 6, which element is different from the light receiving element for the scale pattern, receive the reflection light and makes the light receiving element output reference potential similar to that in a case where the reflection light from the high reflection part 4 is received. Note that the reference potential will be described later.

Also, the reference track 6 is recessed compared to the low reflection part 3 of the scale pattern 2. The scale pattern 2 is higher than the reference track 6 and a step is provided between the reference track 6 and the scale pattern 2. Note that in the mold 10 described later, a reference mirror surface 16 to mold the reference track 6 becomes lower than the mold pattern 12 to form the scale pattern 2. Thus, the mold 10 is molded easily as described later.

As a material of a resin encode scale, for example, resin used for a resin optical element such as a resin lens is preferred. For example, cycloolefin polymer (COP), cycloolefin copolymer (COC), polycarbonate (PC), or polymethyl methacrylate (PMMA/commonly called acrylic) can be used preferably.

Also, other than the above-described thermoplastic resin, a thermo-setting resin can be used in terms of a heat resistance property, durability, chemical resistance, and oil resistance. As the thermoplastic resin, silicone may also be used.

Note that resin used for a resin lens is selected because the resin is likely to have an optical property corresponding to a design when being molded. The resin have superior moldability (transferability) and can transfer a shape from the mold 10 precisely compared to different ordinary resin. Also, resin with which a mirror surface having small roughness of a surface can be easily molded is preferred. In this case, it is preferred that the resin includes little impurity. Also, when the resin including little impurity is resin which does not absorb much visible light, the resin is preferably kept as a transparent resin.

On the upper surface (position measurement surface) of the resin encoder scale 1, to which surface the scale pattern 2 is provided, a film (aluminum coating) of aluminum (aluminum alloy) is formed as a reflection film 8. Thin film forming of the aluminum reflection film 8 can be formed, for example, by a sputter. Also, in this case, it is possible to arrange a plurality of resin encoder scales 1 (main body on which reflection film 8 is not yet formed) on a plurality of plane surfaces and to form an aluminum code on the plurality of resin encoder scales at once by the sputter. Note that for the forming of the reflection film 8, a method other than the sputtering, such as various evaporation methods other than the spattering or a different method for forming a thin film may be used.

Note that the reflection film 8 is not limited to aluminum. Various kinds of metal can be used. However, in consideration of a cost, reflectivity, and the like, aluminum is preferably used.

Also, as the reflection film 8, a film other than the metallic film may be used. For example, a dielectric multi-layer film may be provided as the reflection film 8.

Also, a transparent protection film may be provided on the reflection film 8. When the reflection film 8 is aluminum, for example, $SiO_2$ can be used as the protection film.

Note that when a resin main body of the resin encoder scale 1 which main body is molded with resin has adequate reflectivity of light, the reflection film 8 may not be provided. For example, in the embodiment, the above-described transparent resin which can be used for an optical element can be used preferably as resin. However, for example, a material to improve reflectivity of resin, such as a white pigment or a metallic shiny pigment may be added to the resin to improve reflectivity of the resin and the reflection film 8 may not be provided. Also, for example, as a material of the resin encoder scale 1, a white resin having high reflectivity of light may be used instead of the transparent resin.

In an incremental encoder, as a scale pattern of an encoder scale, a pattern in which the high reflection part and the low reflection part are alternately repeated at a constant pitch can be used. When a head is moved relative to the encoder scale in a state in which light is emitted to the scale pattern of the encoder scale from a light emitting element of the head and reflection light thereof is received by a light receiving element of the head, a wave-shaped signal in which a high signal of when the high reflection part is passed and a low signal of when the low reflection part is passed are alternately repeated is output from the light receiving element.

In this case, for example, rising (falling) of a signal, which is switched from low to high (high to low), to next rising (falling) corresponds to a distance of one pitch of the above-described scale pattern in which the high reflection and the low reflection part are alternately repeated. Thus, by multiplying the above-described distance to be the pitch by the number of times of rising (falling) in the wave-shaped signal output from the light receiving element, a movement distance from a position of an origin can be calculated.

Note that timing of rising at which the signal from the light receiving element changes from low to high can be determined by using the above-described reference potential. That is, timing at which potential of the signal of the light receiving element becomes potential identical to the reference potential from potential lower than the reference potential can be determined as the timing of rising.

Similarly, timing at which the potential of the signal of the light receiving element becomes the potential lower than the reference potential from the potential identical to the reference potential can be determined as timing of falling.

Also, in a case where the head moves in both forward and backward directions relative to the encoder scale and when the head moves in the forward direction, counting up by one is performed every time the rising part of the signal is input from the light receiving element. When the head moves in the backward direction (returning direction), counting down by one is performed every time the rising part of the signal is input from the light receiving element. By multiplying a count value in this case by a length of the above-described pitch, a movement distance from the position of the origin can be calculated.

Also, as the scale pattern 2, an absolute scale pattern may be used instead of an incremental scale pattern in which the low reflection part 3 and the high reflection part 4 are alternately repeated at the same pitch. The absolute scale pattern is, for example, a code including the high reflection part 4 and the low reflection part 3 and may be, for example, a code using two values in which one of the high reflection part 4 and the low reflection part 3 is zero and the other reflection part is one. Also, the code indicated by the scale pattern may be, for example, a gray code (reflected binary code). That is, a code of a plurality of digits which code is formed by the pattern of the high reflection part 4 and the low reflection part 3 and includes 0 and 1 is provided. By the code, an absolute position on the scale pattern may be indicated.

Also, when a track for an origin is provided, the track may be formed in a similar manner by using the scale pattern including the high reflection part 4 and the low reflection part 3.

Also, the surface of the high reflection part 4 may be a curved recess surface instead of a plane surface. That is, light reflected by the surface of the high reflection part 4 may be condensed at a position of the light receiving element. In this case, a peak of a signal output from the light receiving element based on the reception of the reflection light from the high reflection part 4 can be made further higher. That is, a difference between a signal level of the light receiving element in a case where reflection light from the low reflection part 3 is received and a signal level of the light receiving element in a case where reflection light from the high reflection part 4 is received can be made further larger. Note that the recess part may include a part of a dome-like shape such as a spherical surface or a non-spherical surface or may include a shape which is a part of an inner peripheral surface of a cylinder (cylindrical shape). An axial direction of a cylinder in this case may be in the longitudinal direction of the encoder scale and may be in a direction which crosses (is orthogonal to) the longitudinal direction. Also, by forming a shape of a part of the mold, which part is to mold the high reflection part 4, as a protruded surface corresponding to the above-described recess surface, a surface shape of the high reflection part 4 is formed during the molding.

Next, the mold 10 for molding the resin encoder scale 1 will be described.

Here, the mold for injection molding is, for example, a combination of two molds 10 and 18 which are a fixed mold 18 and a movable mold 10. Molding and demolding are possible by moving the movable mold 10 relative to the fixed mold 18.

Figure 4:
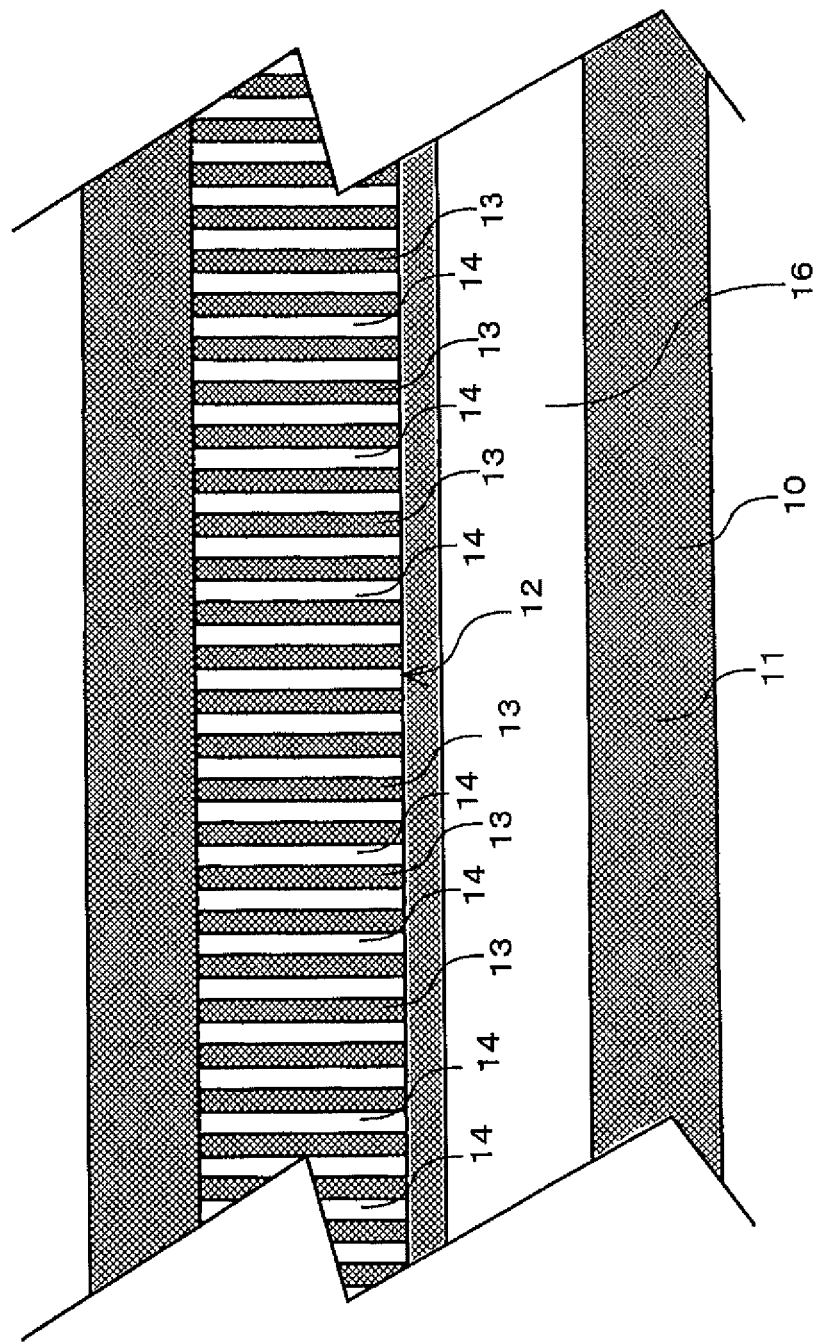
FIG. 4 is a plane view of a main part illustrating a mold for the resin encoder scale of the linear encoder.
Figure 5:
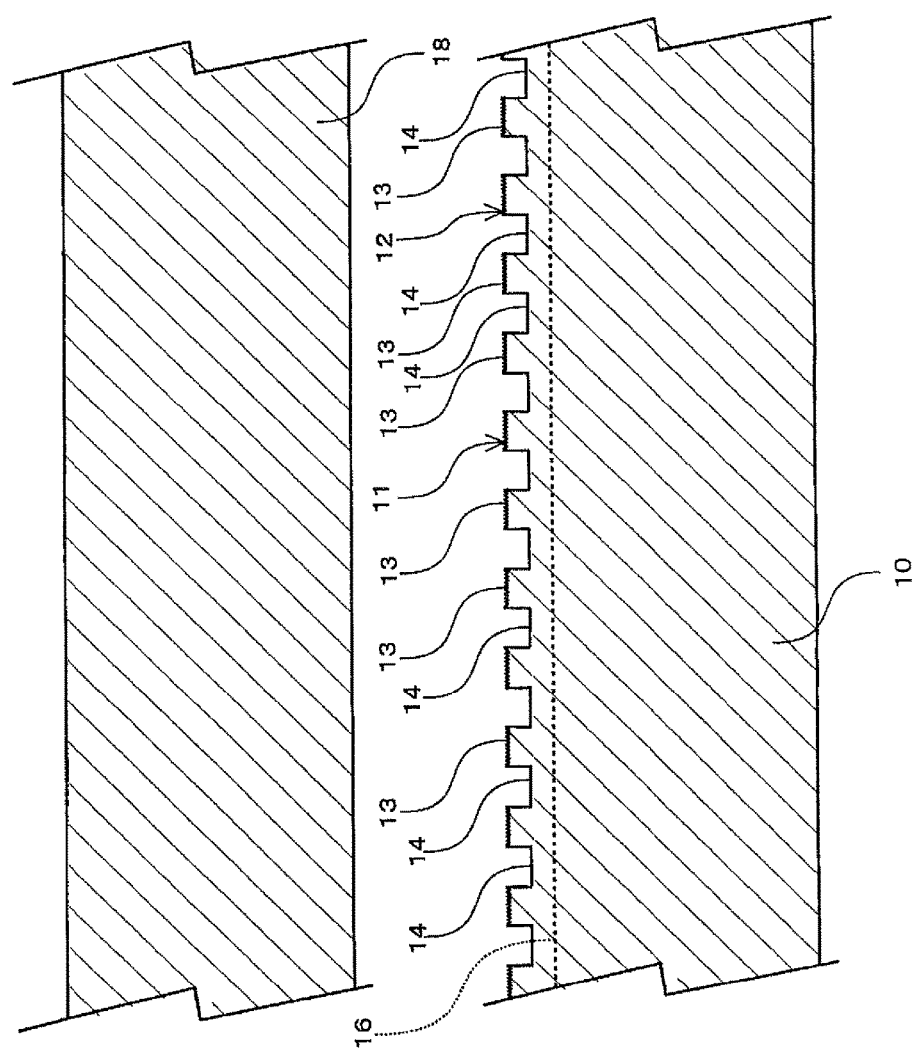
FIG. 5 is a sectional view of a main part illustrating the mold for the resin encoder scale.

As illustrated in FIG. 4, FIG. 5, and FIG. 6(*e*), on a mold surface 11 of the mold 10 which is one of the above-described two molds 10 and 18, the mold pattern 12 corresponding to the scale pattern 2 is provided. The mold surface 11 is to mold a measurement surface of the resin encoder scale 1, to which surface the scale pattern 2 is provided.

The mold pattern 12 includes the rough surface 13 formed by surface-roughing processing and the mirror surface 14 formed by mirror-finishing processing. The rough surface 13 of the mold 10 molds the low reflection part 3 of the resin encoder scale 1 and the mirror surface 14 of the mold 10 molds the high reflection part 4 of the resin encoder scale 1. Also, next to the mold pattern 12, the reference mirror surface 16 to mold the above-described reference track 6 is provided.

Also, on the mold surface of the mold 10 which surface includes the mold pattern 12, a part other than a part formed as a mirror surface of the above-described mirror surface 14 and reference mirror surface 16 is a rough surface including the rough surface 13.

Here, the mold surface of the mold 10 is transferred to resin and the above-described resin encoder scale 1 is formed. Thus, the mold surface of the mold 10 includes a shape a recess and a protrusion of which are opposite of those of a shape of a surface molded by the mold of the resin encoder scale 1. Also, a rough surface part of the mold 10 is transferred to resin and becomes a rough surface part of the resin encoder scale 1 and a mirror surface part of the mold 10 is transferred to the resin and becomes a mirror surface part of the resin encoder scale 1.

Thus, also in the mold 10, basically, roughness of a surface Ra of the mirror surface 14 of the mold pattern 12 is preferably 0.05 µm or smaller and roughness of a surface Ra of the rough surface 13 is preferably 0.1 µm or larger. Also, it is further preferred that the roughness of a surface Ra of the mirror surface 14 is 0.01 µm or smaller and the roughness of a surface Ra of the rough surface 13 is 1.0 µm or larger.

Note that it is necessary that roughness of a surface Ra of the reference mirror surface 16 is similar to that of the mirror surface 14.

Also, a height of protrusion of the rough surface 13 relative to the mirror surface 14 of the mold 10 is preferably shorter than 100 µm. Also, it is further preferred that the height of protrusion of the rough surface 13 relative to the mirror surface 14 is shorter than 60 µm and it is preferred even more that the height of protrusion is less than 20 µm.

Figure 6A:
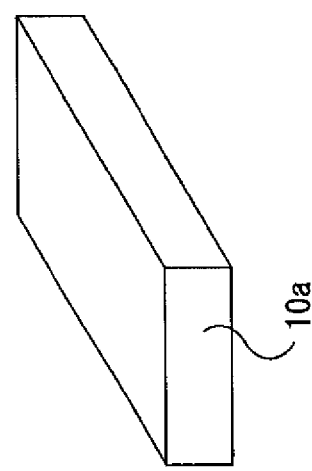
FIG. 6(a), FIG. 6(b), FIG. 6(c), FIG. 6(d), and FIG. 6(e) are perspective views of a main part illustrating processes of producing the mold for the resin encoder scale.
Figure 6B:
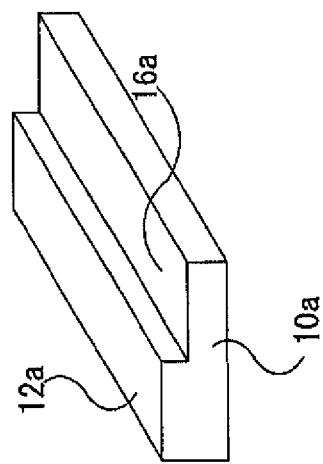
Figure 6C:
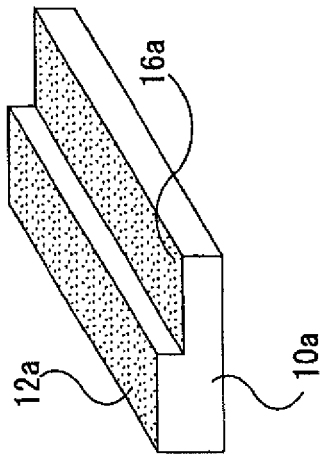

Next, a method for producing the mold 18 will be described with reference to FIG. 6(a) to FIG. 6(e). First, to a metallic plate 10a to be the mold 10 illustrated in FIG. 6(a), a part to be a cavity is formed by cutting processing as illustrated in FIG. 6(b). In this processing, a part 16a to be a reference mirror surface 16 is made lower than a part 12a to be the mold pattern 12 and a step is provided therebetween. Next, as illustrated in FIG. 6(c), to a whole mold surface to be an inner surface of the cavity of the mold 10, a rough surface is formed by blast processing.

Figure 6D:
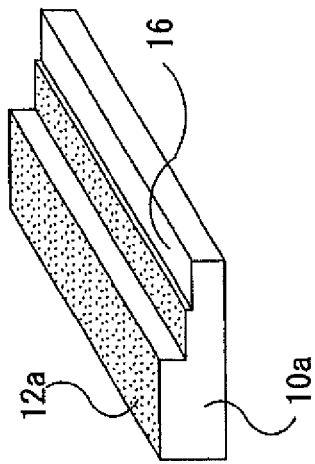

Next, as illustrated in FIG. 6(d), mirror-finishing processing is performed on the part 16a to be the reference mirror surface 16 to mold the reference track 6 and the reference mirror surface 16 is formed.

Figure 6E:
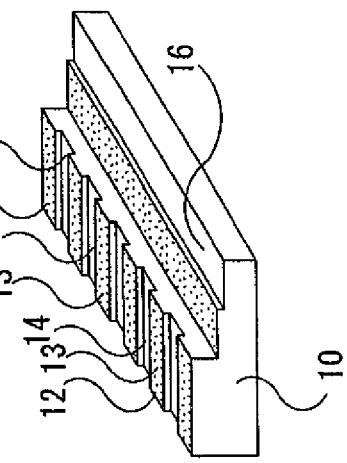

Next, as illustrated in FIG. 6(e) the mirror surfaces 14 are formed at regular intervals on the part 12a, which is to be the mold pattern 12, by cutting processing by the ultra-precision processing device. Thus, the rough surfaces 13 and the mirror surfaces 14 are molded at a constant pitch in a movement direction (longitudinal direction) of the head and the mold pattern 12 is provided. Note that the rough surfaces 13 are parts, where the mirror surfaces 14 are not formed, on the mold pattern 12.

Note that in a case of forming such a pattern, cutting processing of the mirror surface 14 is performed from a side of the mold pattern 12 which is a step higher toward a side of the reference mirror surface 16 which is a step lower. Accordingly, an end side of a part on which cutting processing (mirror-finishing processing) is performed is low due to a step, and thus, the cutting processing can be easily performed without being interrupted.

Note that as a type, a size, and the like of a projection material in the blast processing, what can lower reflectivity (quantity of received light in light receiving element 23) of the low reflection part 3 (including case where there is reflection film 8 and case where there is no reflection film 8) molded by the rough surface 13 formed by the blast processing as much as possible and what has no problem in terms of a cost can be selected.

Also, as the mirror surface 14 of the mold 10, an ultra-precision processing device selected from various ultra-precision processing devices can be used. Here, an ultra-precision processing device which can perform cutting processing to make a plane surface smooth (mirror surface) can be used. Note that the minimum pitch of the rough surface 13 and the mirror surface 14 and roughness of a surface of the mirror surface 14 in the mold pattern 12 depends on an used ultra-precision processing device. Also, as described above, when a stamper is used, further precise processing becomes possible.

Next, a method for producing the resin encode scale will be described.

As described above, by using the mold 10 to which the mold pattern 12 is provided, injection molding of the resin encoder scales 1 is performed by a well-known injection molding method. After the molding, by separating the resin encoder scales 1 from each other, the resin encoder scale 1 can be obtained. Here, when the resin encoder scale 1 has high reflectivity, a part which is molded by the rough surface 13 of the mold pattern 12 of the mold 10 and becomes a rough surface becomes the low reflection part 3 of the scale pattern 2 and a part which is molded by the mirror surface 14 of the mold pattern 12 becomes the high reflection part 4 of the scale pattern 2.

As described later, even when the reflection film 8 is to be provided, a main body of the resin encoder scale 1 is completed by molding. Thus, processing other than the forming of the reflection film 8 is not necessary and the encoder scale is produced in an extremely easy manner.

Also, when used resin is a transparent resin or resin having low reflectivity of light, for example, a film of aluminum is formed as the reflection film 8 on a measurement surface, which includes the scale pattern 2, of the main body of the resin encoder scale 1 by a well-known sputtering method.

In the forming of the reflection film 8, the reflection film 8 is formed on the whole measurement surface, which includes the scale pattern 2, of the main body of the resin encoder scale 1. Thus, the reflection film 8 can be easily formed compared, for example, to a case where the reflection film 8 is formed only on the high reflection part 4 selectively.

In respect to such a resin encoder scale 1, when the above-described mold 10 is produced, mass production can be easily performed and the resin encoder scale 1 can be supplied at a low cost.

Next, a reflection-type optical linear encoder 20 in which the above-described encoder scale 1 is used will be described.

Figure 7:
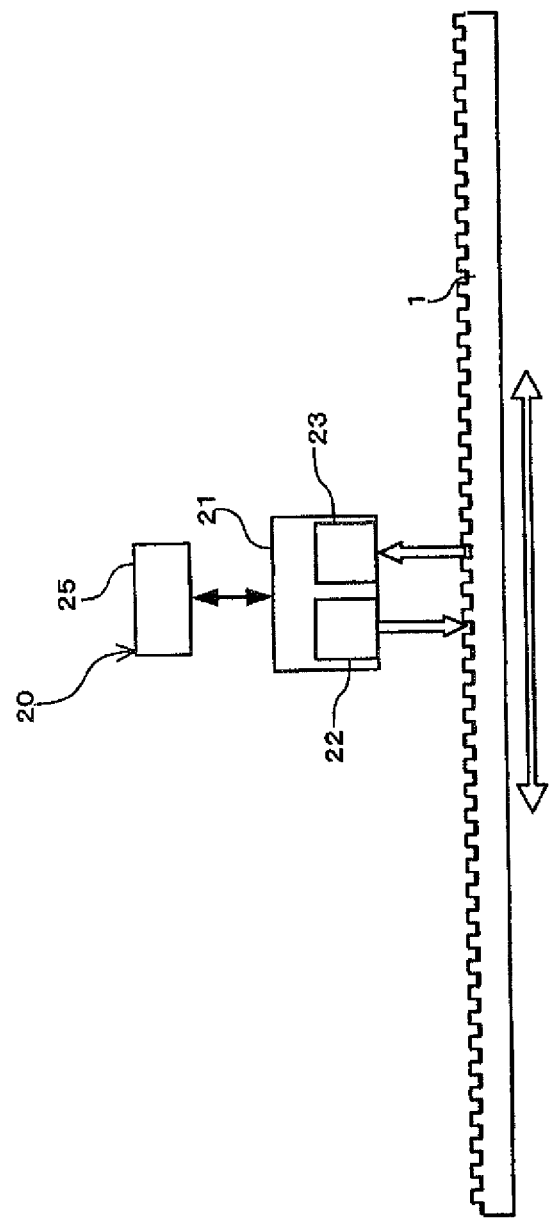
FIG. 7 is a schematic view illustrating the linear encoder using the resin encoder scale.
Figure 8:
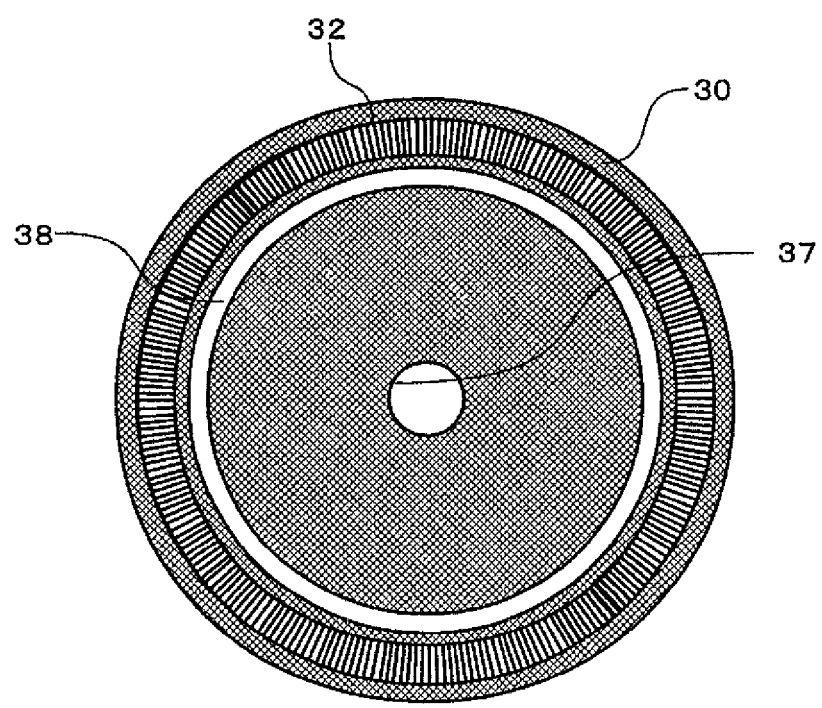
FIG. 8 is a side view illustrating a resin encoder scale of a rotary encoder according to a second embodiment of the present invention.
Figure 9:
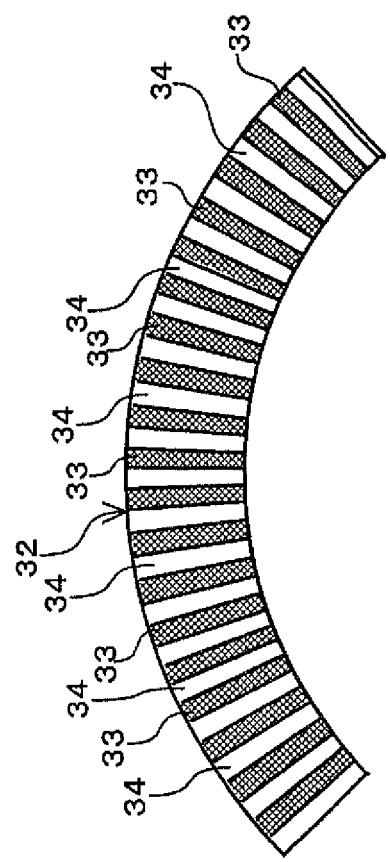
FIG. 9 is a side view of a main part illustrating a scale pattern of the resin encoder scale.
Figure 10:
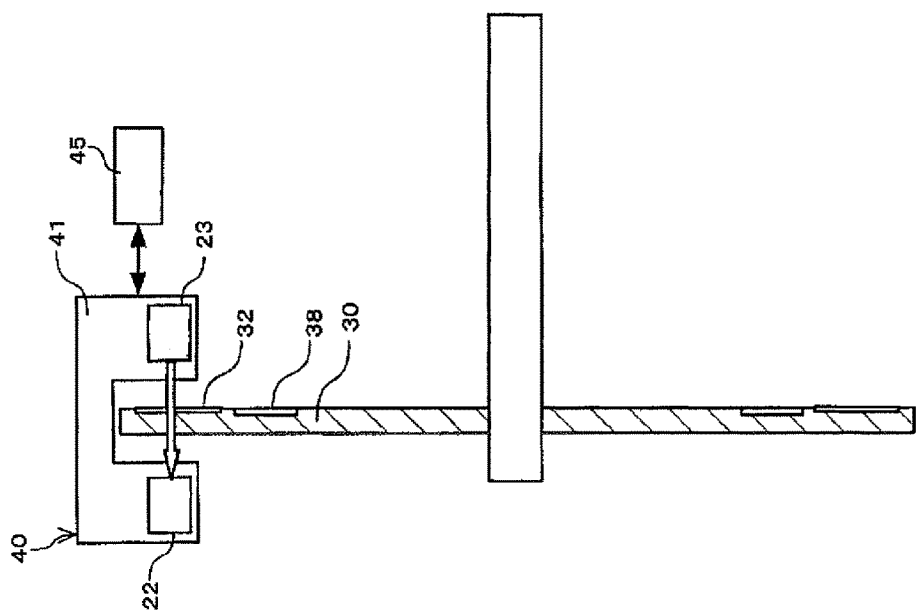
FIG. 10 is a schematic view illustrating a transmission-type rotary encoder using the resin encoder scale.

As illustrated in FIG. 7, the linear encoder 20 includes a linear resin encoder scale 1, a head 21, and a control unit 25. The resin encoder scale 1 and the head 21 can be move relatively in a measurement direction of the resin encoder scale 1. Note that one of the resin encoder scale 1 and the head 21 is fixed and the other is movable.

The head 21 includes a light emitting element 22 and a light receiving element 23. The light emitting element 22 emits light to the scale pattern of the resin encoder scale 1 in a substantially vertical manner. For example, a light-emitting diode (LED) or a semiconductor laser is used as the light emitting element 22. Also, when the light emitting element 22 is diffusion light, the light may be emitted from the light emitting element 22 to the resin encoder scale 1 through a slit.

The light receiving element 23 receives reflection light emitted from the light emitting element 22 and is reflected by the resin encoder scale 1. Thus, both of the light emitting element 22 and the light receiving element 23 are arranged on one side of the resin encoder scale 1.

In the light receiving element 23, a difference between intensity of light reflected by the low reflection part 3 of the resin encoder scale 1 and that of light reflected by the high reflection part 4 is detected. For example, when the scale pattern 2 is the incremental-type, the control unit counts an increase or a decrease in a quantity of received light and calculates a movement distance in response to a pitch of the scale pattern 2, whereby a position is detected and output.

Note that a light receiving element to receive reflection light from the reference track 6 may be arranged and control to prevent the head 21 from falling from the reference track 6 may be performed.

Also, when the scale pattern 2 is the absolute-type, the control unit 25 reads a code from a variation in the quantity of received light based on the above-described pattern including the low reflection part 3 and high reflection part 4 and outputs a position indicated by the read cord. Note that in the absolute-type, an increment-type scale pattern 2 is included in addition to the scale pattern 2 indicating a code and is used in the reading of the cord.

Note that the resin encoder scale 1 molded by the above-described mold 10 is a reflection-type but can be used as a transmission-type. That is, for example, a transparent resin which can be used as an optical element as described above is used as resin and a transparent resin encoder scale is produced. In this case, corresponding to the rough surface 13 and the mirror surface 14 of the mold pattern 12 of the above-descried mold 10, a rough surface and a mirror surface are also molded on the resin encoder scale which is a molded piece. On the rough surface of the resin encoder scale, light is scattered and transmittance of light is decreased, and thus, the rough surface part becomes a low transmission part 33. On the other hand, on the mirror surface of the encoder scale, transmittance of light becomes higher than that of the part, which becomes the rough surface, and the mirror surface part becomes a high transmission part 34.

Accordingly, such as a case of a transmission-type rotary encoder 40 which will be described later, it becomes possible to read a position by a variation in intensity of light which is transmitted through the encoder scale.

In this case, it is not necessary to provide the reflection film 8 to the encoder scale and the encoder scale can be obtained by performing the injection molding.

Note that in the reflection-type resin encoder scale 1, the scale pattern 2 is provided on one side surface (front surface) to be a reflection surface. However, in the transmission-type resin encoder scale, a scale pattern including the mirror surface and the rough surface may be molded on two parallel side surfaces. In this case, arrangement is performed in such a manner that a mirror surface on one side surface overlaps with a mirror surface on the other side surface and a rough surface on one side surface overlaps with a rough surface on the other side surface.

In the mold 10 to mold the encoder scale including the scale pattern 2 on the both surfaces, similar mold patterns 12 are provided on opposing mold surfaces 11 of the above-described two molds.

Next, a transmission-type rotary resin encoder scale 30 used in the transmission-type optical rotary encoder 40 which will be described later will be described.

The resin encoder scale 30 includes, for example, a disk-shape and includes, in a center thereof, a through hole 37 through which a rotary shaft is pierced and fixed. On one circular side surface (or both side surfaces) of the encoder scale 30, for example, an incremental-type scale pattern 32 is formed.

On the scale pattern 32, the low transmission part 33, a surface of which is a rough surface and which has low transmittance of light, and the high transmission part 34, a surface of which is a mirror surface and which has higher transmittance of light than the low transmission part 33, are provided. Also, the scale pattern 32 is provided circularly along a whole circumference in a measurement direction (direction of relative movement of head 41 which will be described later) and in a circumferential direction a center of which is a center of the circular side surface.

In the above-described circumferential direction, the low transmission part 33 and the high transmission part 34 are arranged alternately. Accordingly, when the resin encoder scale 30 rotates or when the head 41, which will be described later, rotates (perform peripheral movement), the light receiving element 23 which will be described later can calculates a position by a variation in intensity of light which passes through the low transmission part 33 and the high transmission part 34. Also, inside the scale pattern 32, a reference track 38 is formed along the whole circumference in the circumferential direction of the disk-shaped resin encoder scale 30.

In a case of the rotary resin encoder scale 30, the scale pattern 32 may be the absolute-type instead of the incremental-type. Also, when a track for an origin is provided, the track may be formed in a similar manner by using the scale pattern including the high transmission part 34 and the low transmission part 33. Also, a reflection film may be provided to be the reflection-type instead of the transmission-type. In this case, as the resin of the encoder scale, resin having a color with high reflectivity of light may be used instead of a transparent resin. A color of the resin in this case may be added by a pigment or a dye. Also, the above-described reflection film 8 may be formed on the scale pattern.

Note that the reflection-type and the transmission-type include different structures in a point whether reflection is performed or transmission is performed, but include the same structure in a point that a scale is formed by the mirror surface and the rough surface. Also, the rotary-type and the linear-type include different structures in a point whether a scale is formed circularly in a circumferential direction or a scale is formed linearly. However, other than that, the same basic structure is included.

A difference between roughness of a surface of the low transmission part 33 and that of the high transmission part 34 is based on roughness of a surface of a rough surface formed on a mold surface of the mold and roughness of a surface of a mirror surface of when injection molding of the resin encoder scale 30 is performed. The difference only needs to make the following possible. That is, in a case where the transmission-type optical encoder is used and when the light receiving element receives pieces of light, which are emitted from the light emitting element and are respectively transmitted through the low transmission part 33 and the high transmission part 34, a difference between a quantity of received transmission light of the low transmission part 33 and a quantity of received transmission light of the high transmission part 4 can be recognized adequately.

For example, transmittance of the high transmission part 34 is preferably 50% or higher and transmittance of the low transmission part 33 is preferably 25% or lower. Also, it is preferred that a difference between the transmittance of the high transmission part 34 and the transmittance of the low transmission part 33 is 25% or larger. Moreover, the transmittance of the high transmission part 34 is preferably 80% or higher and the transmittance of the low transmission part 33 is preferably 25%. Furthermore, the transmittance of the low transmission part 33 is preferably 10% or lower.

Also, a difference between the transmittance of the high transmission part 34 and the transmittance of the low transmission part 33 is preferably 25% or larger and it is further preferred that the difference between the transmittance of the high transmission part 34 and the transmittance of the low transmission part 33 is 55% or larger and that the difference is 70% or larger.

By making the difference between the transmittance of the high transmission part 34 and the transmittance of the low transmission part 3 25% or larger, as described above, it becomes possible to give an adequate difference in the quantity of received light in the light receiving element and to optically read the scale pattern 12 of the resin encoder scale 30 adequately.

Also, to realize such transmittance described above by the high transmission part 34 and the low transmission part 33, the roughness of a surface Ra of the high transmission part 34 is preferably 0.05 μm or smaller and the roughness of a surface Ra of the low transmission part 33 is preferably 0.1 μm or larger. Also, it is further preferred that the roughness of a surface Ra of the high transmission part 34 is 0.01 μm or smaller and the roughness of a surface Ra of the low transmission part 33 is 1.0 μm or larger.

Note that it is necessary that roughness of a surface Ra of the reference track 16 is similar to that of the high transmission part 34.

In the scale pattern 12, the low transmission part 33 and the high transmission part 34 each of which becomes a scale are arranged with the same width. The width is longer than an alternation pitch of the low transmission part 33 and the high transmission part 34.

Also, similarly to a case of the above-described linear-type, based on a structure of a mold surface of the mold, the high transmission part 34 is slightly protruded compared to the low transmission part 33. That is, the low transmission part 33 is formed as a recess part and the high transmission part 34 is formed as a protruded part. A step is formed between the low transmission part 33 and the high transmission part 34. Note that a surface of the low transmission part 33 and a surface of the high transmission part 34 are plane surfaces parallel to each other.

As described above, it is preferred that the high transmission part 34 is formed in a protruded manner relative to the low transmission part 33 and that a height of protrusion of the high transmission part 34 relative to the low transmission part 33 is shorter than 100 μm. It is further preferred that the height of protrusion of the high transmission part 34 relative to the low transmission part 33 is shorter than 60 μm and that the height of protrusion of the high transmission part 34 relative to the low transmission part 33 is shorter than 20 μm.

When the height of the high transmission part 34 is too high compared to the low transmission part 33, it is likely that light is blocked or reflected by the step between the low transmission part 33 and the high transmission part 34 and there may be a bad influence when the light receiving element receives light from the light emitting element.

Also, a pitch between the low transmission part 33 and the high transmission part 44 each of which is a scale of the scale pattern 12 is, for example, at a 0.1 mm level and a length in a measurement direction (direction of relative movement of head) in each of the low transmission part 33 and the high transmission part 34 is around a half of the pitch. Note that a pitch (resolution of scale) of the scale pattern 12 is similar to that in a case of the above-described linear-type. Also, the rotary-type may also be molded by a mold using a stamper.

Also, a surface of the high transmission part 34 may be a protruded surface, which includes a curved-surface shape, instead of a plane surface. That is, light transmitted through the high transmission part 34 may be condensed at a position of the light receiving element. In this case, a peak of a signal output from the light receiving element based on the reception of the transmission light from the high transmission part 34 can be made further higher. That is, a difference between a signal level of the light receiving element in a case where transmission light from the low transmission part 33 is received and a signal level of the light receiving element in a case where transmission light from the high transmission part 34 is received can be made further larger.

Note that the protruded part may include a part of a dome-like shape such as a spherical surface or a non-spherical surface or may include a shape which is a part of an outer peripheral surface of a cylinder (cylindrical shape). An axial direction of a center of a circle in this case may be in the longitudinal direction (circumferential direction of rotary-type) of the encoder scale or maybe in a direction which crosses (is orthogonal to) the longitudinal direction. Also, instead of forming only one surface of the high transmission part 34 as a protruded surface, both surfaces of the high transmission part 34 may be formed as protruded surfaces, one surface facing a side of the light emitting element and the other surface facing a side of the light receiving element. By forming a shape of a part of the mold, which part is to mold the high transmission part 34, as a recess surface corresponding to the above-described protruded surface, a surface shape of the high transmission part 34 is formed during the molding.

Also, the mold for molding the rotary-type resin encoder scale 30 is similar to that for the above-described linear and reflection-type other than a point that a shape of the encoder scale 30 is circular instead of rectangular and that a measurement direction of the scale pattern 32 is in a circumferential direction instead of a straight line. That is, similarly to the mold 10, as the mold pattern 12 on the mold surface 11, the rough surface 13 and the mirror surface 14 are formed by blast processing and by cutting by an ultra-precision processing device, as described above. The low transmission part 33 (low reflection part) a surface of which is a rough surface is molded by the rough surface of the mold and the high transmission part 34 (high reflection part) a surface of which is a mirror surface is molded by the mirror surface of the mold.

Next, the transmission-type rotary encoder 40 will be described. The rotary encoder 40 includes the above-described resin encoder scale 30, the head 41, and a control unit 45. In the head 41, a light emitting element 22 and a light receiving element 23 are arranged oppositely with the resin encoder scale 30 therebetween. The head 41 is movable in a week direction relative to the disk-shaped resin encoder scale 30. For example, the head 41 is fixed and the resin encoder scale 30 rotates.

The light emitting element 22 and the light receiving element 23 are respectively similar to the above-described light emitting element 22 and the light receiving element 23. The light emitting element 22 and the light receiving element 23 are arranged oppositely with the resin encoder scale 30 therebetween. The light emitting element 22 emits light to the resin encoder scale 30 and the light receiving element 23 measures the light transmitted through the resin encoder scale 30. At this time, a quantity of received light transmitted through the low transmission part 33 and a quantity of received light which passes through the high transmission part 34 are different from each other and a quantity of received light in the light receiving element 23 varies. In the control unit 45, the variation of the quantity of received light is counted and a position is calculated. Also, as described above, the control unit 45 may output a position indicated by a code by using an absolute-type scale pattern 32.

Also, the rotary-type resin encoder scale 30 may be a reflection-type including a scale pattern which includes the above-described low reflection part and high reflection part. In this case, the scale pattern 32 may be provided to one side surface of the rotary-type resin encoder scale 30 and a reflection film 8 may be provided on the whole side surface to which the scale pattern 32 is provided. Also, a protection film may be provided on the reflection film 8.

In the above-described embodiment, it is assumed that the encoder scale is made from resin and that the low reflection part and the high reflection part or the low transmission part and the high transmission part are formed as the scale pattern of the encoder scale during the molding of the resin encoder scale. In this case, it is necessary that reflectivity of the low reflection part is lower than that of the high reflection part. However, in the scale pattern, for example, only the high reflection part where a signal output from the light receiving element becomes high and the low reflection part where the signal becomes low are necessary. Thus, even when reflectivity of light on the surface of the low reflection part is not low, a signal output from the light receiving element can be made low by making a reflection direction of light from the light emitting element deviate from the light receiving element.

For example, it is assumed that a resin encoder scale is used as an encoder scale of an encoder using a head in which a light emitting element and a light receiving element are arranged proximately and that a reflection part (high reflection part) to reflect, to the light receiving element, light emitted from the light emitting element and a different reflection part (low reflection part) to reflect, not to the light receiving element but to a position deviated from the light receiving element, the light emitted from the light emitting element are provided to a scale pattern of the encoder scale.

The reflection part is a plane surface which is substantially orthogonal to an emission direction of light from the light emitting element and the different reflection part is a plane surface which is inclined in the emission direction of the light from the light emitting element.

That is, since the surface of the different reflection part is inclined relative to the surface of the reflection part, the light emitted from the light emitting element is reflected to a position deviated from the light receiving element in order to make a quantity of received light in the light receiving element become lower in a case where the light emitting element emits light to the different reflection part compared to a case where the light emitting element emits light to the reflection part.

A shape corresponding to each of the reflection part and the different reflection part is formed on the mold and the different reflection part is inclined relative to the reflection part during the molding of the resin encoder scale.

In this case, it is not necessary to form the surface of the different reflection part (low reflection part) as a rough surface or a mirror surface. It is necessary to form the reflection part (high reflection part) as a mirror surface. Also, for example, when a transparent resin is used and reflectivity of light thereof is not high, a reflection film is preferably provided at least on a scale pattern part of the resin encoder scale.

Also, when the light receiving element and the light emitting element are arranged separately, the light receiving element may be arranged at a position toward which light emitted from the light emitting element and reflected by the different reflection part travels. In this case, the reflection part and the different reflection part are reversed.

Also, by this method using the inclined surface, light is reflected by both of the reflection part and the different reflection part, and thus, unnecessary reflection light is increased. Accordingly, a part of the unnecessary reflection light may reach the light receiving element and may become a factor to increase the minimum level of an output signal of the light receiving element. Thus, the light emitting element and the light receiving element may be arranged separately and an incident angle of light from the light emitting element may also be inclined in the reflection part in order to reflect light in such a manner that the reflected light is received by the light receiving element which is away from the light emitting element.

In this case, an inclination direction of the surface of the reflection part and that of the different reflection part are made opposite. Thus, a quantity of received unnecessary reflection light in the light receiving element can be further reduced.

As a method to reflect light by using a transparent resin, other than the above-described method to use a reflection film, there is a method to provide a microprism-shape on a surface on a side to be a back surface of a transparent resin plate relative to an emission direction of light (on a side irradiated with light transmitted through resin plate).

In the microprism-shape, for example, a plurality of shapes each of which is opposing two symmetrical inclined surfaces is formed. When light which becomes incident substantially at a right angle to a front surface of the transparent resin plate passes through the transparent resin plate and reaches the microprism-shape on the back surface of the transparent resin plate, total reflection is repeated twice and the light is reflected in a direction opposite of the incident direction.

Note that in the microprism-shape, an inclined surface to perform first total reflection of the light incident to the transparent resin plate and an inclined surface to perform second total reflection thereof are necessary. For example, a structure in which a plurality of grooves or projections each of which includes a triangular sectional shape is arrayed in parallel may be included.

Note that it is necessary to set angles of the inclined surfaces in such a manner that a reflection direction becomes the opposite direction of an initial incident angle of light by the total reflection which are performed twice. In this case, the two inclined surfaces are generally symmetrical inclined surfaces corresponding to two sides with equal length of an isosceles triangle. However, the two inclined surfaces may not be symmetrical inclined surfaces as long as the final reflection direction becomes the opposite direction of the initial incident angle.

Also, in addition to the shape in which the above-described grooves or projections are arrayed, the microprism-shape may be a shape in which protruded parts or recess parts of a plurality of pyramid shapes, quadrangular pyramids, triangular pyramids, or circular cones are arrayed proximately and regularly (arrayed in such manner that opposite inclined surfaces face each other).

Even in a case of the above-described modified example, the reflection part, the different reflection part, and the microprism-shape are preferably formed integrally with a resin plate.

REFERENCE SIGNS LIST 1 resin encoder scale
2 scale pattern
3 low reflection part 4 high reflection part
10 mold
11 mold surface
12 mold pattern
13 rough surface
14 mirror surface
20 linear encoder
21 head
22 light emitting element
23 light receiving element
30 resin encoder scale
32 scale pattern
33 low transmission part
34 high transmission part
40 rotary encoder
41 head

The invention claimed is:

1. A resin encoder scale used in a reflection-type optical encoder, comprising:
a scale pattern made of resin material for position measurement, on a surface of which irradiated light is reflected,
a reflection film provided on the scale pattern, wherein the surface of the scale pattern includes a combination of
a low reflection part a surface of which is molded as a rough surface and which has low reflectivity of light in a state where molded surface of resin member has been resin-molded; and
a high reflection part which is molded as a mirror surface and which has a higher reflectivity of light than the low reflection part in a state where molded surface of resin member has been resin-molded; and
the reflection film is provided over both the low reflection part and the high reflection part.

2. The resin encoder scale according to claim 1, wherein the high reflection part is formed in a protruded manner relative to the low reflection part.

3. The resin encoder scale according to claim 2, wherein a height of protrusion of the high reflection part relative to the low reflection part is shorter than 100 μm.

4. The resin encoder scale according to claim 1, wherein the reflectivity of light of the high reflection part is set to be 50% or higher and the reflectivity of light of the low reflection part is set to be 25% or lower and a difference between the reflectivity of the high reflection part and that of the low reflection part is 25% or larger.

5. The resin encoder scale according to claim 1, wherein surface roughness of a molded surface Ra of the high reflection part is 0.05 μm or smaller and surface roughness of a molded surface Ra of the low reflection part is 0.1 μm or larger.

6. An encoder comprising:
the resin encoder scale according to claim 1; and
a head including a light emitting element configured to emit light to the encoder scale and a light receiving element configured to receive light emitted from the light emitting element and reflected by the encoder scale, wherein
when the head moves relative to the encoder scale, a position of the head relative to the encoder scale is measured based on a variation in a quantity of received light in the light receiving element due to a difference between reflectivity of light of the low reflection part and that of the high reflection part in the scale pattern.

7. A resin encoder scale according to claim 1, wherein the resin material is transparent.

8. An encoder comprising:
an encoder scale including a scale pattern which is a combination of a low reflection part having low reflectivity of light and a high reflection part having higher reflectivity of light than the low reflection part; and
a head including a light emitting element configured to emit light to the encoder scale, and a light receiving element configured to receive light emitted from the light emitting element and reflected by the encoder scale, wherein
when the head moves relative to the encoder scale, a position of the head relative to the encoder scale is measured based on a variation in a quantity of received light in the light receiving element due to a difference between the reflectivity of light of the low reflection part and that of the high reflection part in the scale pattern, and wherein the encoder scale includes an injection-molded resin, the scale pattern which is a combination of
a low reflection part which is molded as a rough surface and which has a low reflectivity of light in a state where molded surface of resin member has been resin-molded, and
a high reflection part which is molded as a mirror surface and which has a higher reflectivity of light than the low reflection part in a state where molded surface of resin member has been resin-molded;
a reflection film is provided at least on the whole scale pattern; and
the reflection film is provided over both the low reflection part and the high reflection part.

9. An encoder according to claim 8, wherein in the encoder scale, the high reflection part is formed in a protruded manner relative to the low reflection part.

10. The resin encoder scale according to claim 9, wherein a height of protrusion of the high reflection part relative to the low reflection part is shorter than 100 μm.

11. The encoder according to claim 8, wherein in the encoder scale, the reflectivity of light of the high reflection part is set to be 50% or higher and the reflectivity of light of the low reflection part is set to be 25% or lower and a difference between the reflectivity of the high reflection part and that of the low reflection part is 25% or larger.

12. The encoder according to claim 8, wherein in the encoder scale, surface roughness of a molded surface Ra of the high reflection part is 0.05 μm or smaller and surface roughness of a molded surface Ra of the low reflection part is 0.1 μm or larger.

13. The encoder according to claim 8, wherein
the encoder scale includes a reference track which is formed from one
end of the scale pattern to the other end thereof in a zonal manner in a direction of relative movement of the head, and
the reference track has roughness of a surface similar to that of the high
reflection part.

14. The encoder according to claim 13, wherein switching of the high reflection part and the low reflection part in a signal of when the scale pattern is optically read is determined by using a signal which is based on light reflected by the reference track.

15. The encoder according to claim 13, wherein a step is provided between the reference track and the scale pattern and the reference track is lower than the scale pattern.

16. A resin encoder scale according to claim 8, wherein the resin material is transparent.

17. A mold for a resin encoder scale which mold is to perform injection molding of a resin encoder scale which is used in a reflection-type optical encoder and to which a scale pattern for position measurement is molded, the scale pattern being a combination of a low reflection part having low reflectivity of light and a high reflection part having higher reflectivity of light than the low reflection part, the mold comprising:
 a mold pattern provided, corresponding to the scale pattern, on a mold surface configured to mold the scale pattern of the resin encoder scale, the mold pattern being a combination of a rough surface on which surface-roughing processing is performed and which is configured to mold the low reflection part and a mirror surface on which mirror-finishing processing is performed and which is configured to mold the high reflection part a reflection film provided at least on the whole scale pattern; wherein the reflection film is provided over both the low reflection part and the high reflection part.

18. The mold for a resin encoder scale according to claim 17, wherein the rough surface is formed in a protruded manner relative to the mirror surface in the mold pattern.

19. The mold for a resin encoder scale according to claim 18, wherein a height of protrusion of the rough surface relative to the mirror surface is shorter than 100 μm.

20. The mold for a resin encoder scale according to claim 17, wherein roughness of a surface Ra of the mirror surface is 0.05 μm or smaller and roughness of a surface Ra of the rough surface is 0.1 μm or larger in the mold pattern.

21. A method for producing a resin encoder scale in which method injection molding of a resin encoder scale which is used in a reflection-type optical encoder and to which a scale pattern for position measurement is provided is performed by injection of resin into a mold, the scale pattern being a combination of a low reflection part having low reflectivity of light and a high reflection part having higher reflectivity of light than the low reflection part, the method comprising:
 molding the resin encoder scale including the scale pattern, which is a combination of the high reflection part molded by a mirror surface of the mold and the low reflection part molded by a rough surface of the mold, by injecting resin into the mold in which a mold pattern is provided, corresponding to the scale pattern, to a mold surface configured to mold the scale pattern of the encoder scale, the mold pattern being a combination of
  a low reflection part which is molded as a rough surface and which has a low reflectivity of light in a state where molded surface of resin member has been resin-molded, and
  a high reflection part which is molded as a mirror surface and which has a higher reflectivity of light than the low reflection part in a state where molded surface of resin member has been resin-molded; and
 providing a reflection film at least on the whole scale pattern of the resin encoder scale molded by using the mold, wherein
  the reflection film is provided over both the low reflection part and the high reflection part.

22. A resin encoder scale according to claim 21, wherein the resin material is transparent.

23. A method for producing a resin encoder scale according to claim 22, wherein the rough surface is formed in a protruded manner relative to the mirror surface in the mold pattern.

* * * * *